(12) United States Patent
Thurston

(10) Patent No.: US 7,681,127 B2
(45) Date of Patent: *Mar. 16, 2010

(54) DYNAMIC LOCALIZATION FOR DOCUMENTS USING LANGUAGE SETTING

(75) Inventor: Robert Thurston, Arlington, MA (US)

(73) Assignee: Aspect Software, Inc., Lombard, IL (US)

( * ) Notice: Subject to any disclaimer, the term of this patent is extended or adjusted under 35 U.S.C. 154(b) by 975 days.

This patent is subject to a terminal disclaimer.

(21) Appl. No.: 11/008,829

(22) Filed: Dec. 10, 2004

(65) Prior Publication Data

US 2005/0102616 A1    May 12, 2005

Related U.S. Application Data

(63) Continuation of application No. 09/566,242, filed on May 5, 2000, now Pat. No. 6,865,716.

(51) Int. Cl.
*G06F 17/00* (2006.01)
(52) U.S. Cl. .................. 715/265; 715/234; 715/273; 715/264; 704/4; 704/8; 704/277
(58) Field of Classification Search ............. 715/265, 715/234, 273; 704/277, 4, 8
See application file for complete search history.

(56) References Cited

U.S. PATENT DOCUMENTS

| | | | |
|---|---|---|---|
| 5,555,179 A | 9/1996 | Koyama et al. | |
| 5,765,033 A | 6/1998 | Miloslavsky | |
| 5,778,356 A * | 7/1998 | Heiny | 707/2 |
| 5,926,539 A | 7/1999 | Shtivelman | |
| 5,944,790 A * | 8/1999 | Levy | 709/218 |
| 5,946,387 A | 8/1999 | Miloslavsky | |
| 5,953,332 A | 9/1999 | Miloslavsky | |
| 5,953,405 A | 9/1999 | Miloslavsky | |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,067,357 A | 5/2000 | Kishinsky et al. | |
| 6,073,090 A * | 6/2000 | Fortune et al. | 704/8 |
| 6,108,711 A | 8/2000 | Beck et al. | |
| 6,138,139 A | 10/2000 | Beck et al. | |
| 6,167,395 A | 12/2000 | Beck et al. | |
| 6,170,011 B1 | 1/2001 | Beck et al. | |
| 6,175,563 B1 | 1/2001 | Miloslavsky | |
| 6,175,564 B1 | 1/2001 | Miloslavsky et al. | |
| 6,185,292 B1 | 2/2001 | Miloslavsky | |
| 6,324,500 B1 | 11/2001 | Amro et al. | |
| 6,341,372 B1 * | 1/2002 | Datig | 717/136 |
| 6,343,333 B1 | 1/2002 | Matsumoto et al. | |
| 6,345,305 B1 | 2/2002 | Beck et al. | |
| 6,373,836 B1 | 4/2002 | Deryugin et al. | |

(Continued)

*Primary Examiner*—Stephen S Hong
*Assistant Examiner*—Matthew J Ludwig
(74) *Attorney, Agent, or Firm*—Husch Blackwell Sanders Welsh & Katz

(57) ABSTRACT

A method, for dynamic document localization, includes issuing a request for locale-neutral content, the request having a locale-neutral identifier. The locale-neutral content is received responsive to the request. Localized language content is built by applying a language setting for a current language selection to the locale-neutral content. The language setting includes a language-specific string in a strings data structure corresponding to the current language selection.

11 Claims, 7 Drawing Sheets

U.S. PATENT DOCUMENTS

| | | |
|---|---|---|
| 6,389,007 B1 | 5/2002 | Shenkman et al. |
| 6,393,015 B1 | 5/2002 | Shtivelman |
| 6,449,638 B1 | 9/2002 | Wecker et al. |
| 6,492,995 B1 * | 12/2002 | Atkin et al. ................. 715/703 |
| 6,623,529 B1 * | 9/2003 | Lakritz ....................... 715/205 |
| 6,732,156 B2 | 5/2004 | Miloslavsky |
| 6,865,716 B1 * | 3/2005 | Thurston .................... 715/536 |
| 2003/0140316 A1 * | 7/2003 | Lakritz ....................... 715/536 |

* cited by examiner

```
<html>
<head>

<!-- Dynamic page example -->

<Title>Dynamic Page Example</Title>

<!-- Includes -->

<script language="JavaScript" src="stringtable.js:>
</script> // string tables
<script language="JavaScript" src"localization.js">
</script> // localization code <script language="JavaScript"> function buildPage(){
    getLanguage();
    var new_page  = "<TITLE>" + getString(1) + "</TITLE>";
                  +    "<H1>" + getString(2) + "</H1>"
                  +    "<P>" + getString(3) + "</P>"
                  +    "<UL>" + "<LI>"+getString(4)+</UL>"

+    "<UL>"+"<LI>"+getString(5)+</UL>"

+    "<P>" + getString(6) + "</P>";

document.write(new_page);

document.close();
}

</script>
</head>

<body onLoad=buildPage()>
</body>

</html>
```

*FIG. 4*

```
//
//      localization.js
//
//      JavaScript localization on-the-fly functions
//      'string_table.js' must be included first in
//      frameset doc to define elements of 'strings_all[]'
//
/////////////////////////////////////////////////////////////////
//   Language choices - first element is the default
language identifier var languages = new Array(
     "English",
     "Deutsch",
     "Francais");

//   String tables to use for the above languages - defined
//   in string_table.js
//   Page specific string tables must be set up in the same
//   order var strings_all = new Array(
     strings_English,
     strings_deutsch,
     strings_francais);

//   globals that hold the localization settings var strings_local    =    strings_all[0];
var language_setting=    -1;

/////////////////////////////////////////////////////////////////

//   function to retrieve a string from the string table
//   passing an erroneous key returns 'Undefined String' function getString(string_key) {
     var rvalue = "Undefined String";
     if (string_key < strings_local.length)
          rvalue = strings_local[string_key];
     else
          rvalue.blink();
     return rvalue;
}

//   return the current language setting (as an index)
```

*FIG. 5A*

```
//    if unknown - look in the client's locale cookie.

function getLanguage()   {
      if (language_setting == -1)   {
           var cookie_copy = new Cookie();
           var setting = cookie_copy.getValue("language");
           for (var I = 0; i < languages.length; i++)   {
                if (setting == languages[i])   {
                     language_setting = i;
                     strings_local = strings_all[language-
                     setting];
                     break;
                }
           }
           if (language_setting == -1)   {
                language_setting == 0;
           }
      }
      return language_setting;
}

//    set a new language
//    passing erroneous index leaves language unaltered function setLanguage(lang_index)   {
      if (lang_index < languages.length) {
           language_setting = lang_index;
           strings_local = strings_all(lang_index);
      }
      var cookie_copy = new Cookie();
      cookie_copy.setValue("language",
languages[language_setting]);
}
```

*FIG. 5B*

DYNAMIC LOCALIZATION FOR DOCUMENTS USING LANGUAGE SETTING

CLAIM OF PRIORITY

This present application is a continuation of U.S. patent application Ser. No. 09/566,242 filed May 5, 2000 now U.S. Pat. No. 6,865,716, which is incorporated herein by reference.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

This example embodiment of the invention relates to the field of client/server technologies, and more specifically, to dynamic localization of electronic documents.

BACKGROUND OF THE INVENTION

The global nature of the World Wide Web (WWW) has given rise to the need for localizing the contents of Web pages for the specific language skills of a given user. Localization refers to the process of altering a document or program so that it is appropriate for the area in which it is used. For example, if the area in which a document is used is the German language, then when a user requests a Web page, the contents of the Web page are displayed in German.

In currently existing systems, as illustrated in FIG. 1, a Web page document written in HTML (HyperText Markup Language, a markup language used for documents on the WWW) is requested from a client computer system (client 100) via a client application such as a Web browser 102. A user enters a uniform resource locator (URL) specifying an address for the particular document. A locale is determined for the user's computer system, and a document specific to the locale, as determined by the locale-specific URL 114, is determined. The URL is sent to a Web server (server). The server has multiple copies of the HTML document 106, 108, 110, each tailored to a specific language, or locale. Using the locale-specific URL, the Web server retrieves the HTML document 112 for the locale indicated by the URL from a repository comprising the locale-specific HTML document. The locale-specific HTML document is returned to the client, and the localized content 116 is communicated to the client.

There are various problems associated with this method. First, the content developer must create an HTML document for each existing locale. Secondly, the content developer must keep the various localized copies synchronized, wherein edits to the contents of a Web page must be reflected in all of the HTML documents. Third, if the user requests a different locale setting, the browser must fetch a new copy of the HTML document.

SUMMARY OF THE INVENTION

A method, for dynamic document localization, includes issuing a request for locale-neutral content, the request having a locale-neutral identifier. The locale-neutral content is received responsive to the request. Localized language content is built by applying a language setting for a current language selection to the locale-neutral content. The language setting includes a language-specific string in a strings data structure corresponding to the current language selection.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 illustrate sample client-side scripting code for localizing contents.

FIGS. 5A and 5B illustrate sample HTML code.

DETAILED DESCRIPTION

Figure 2:
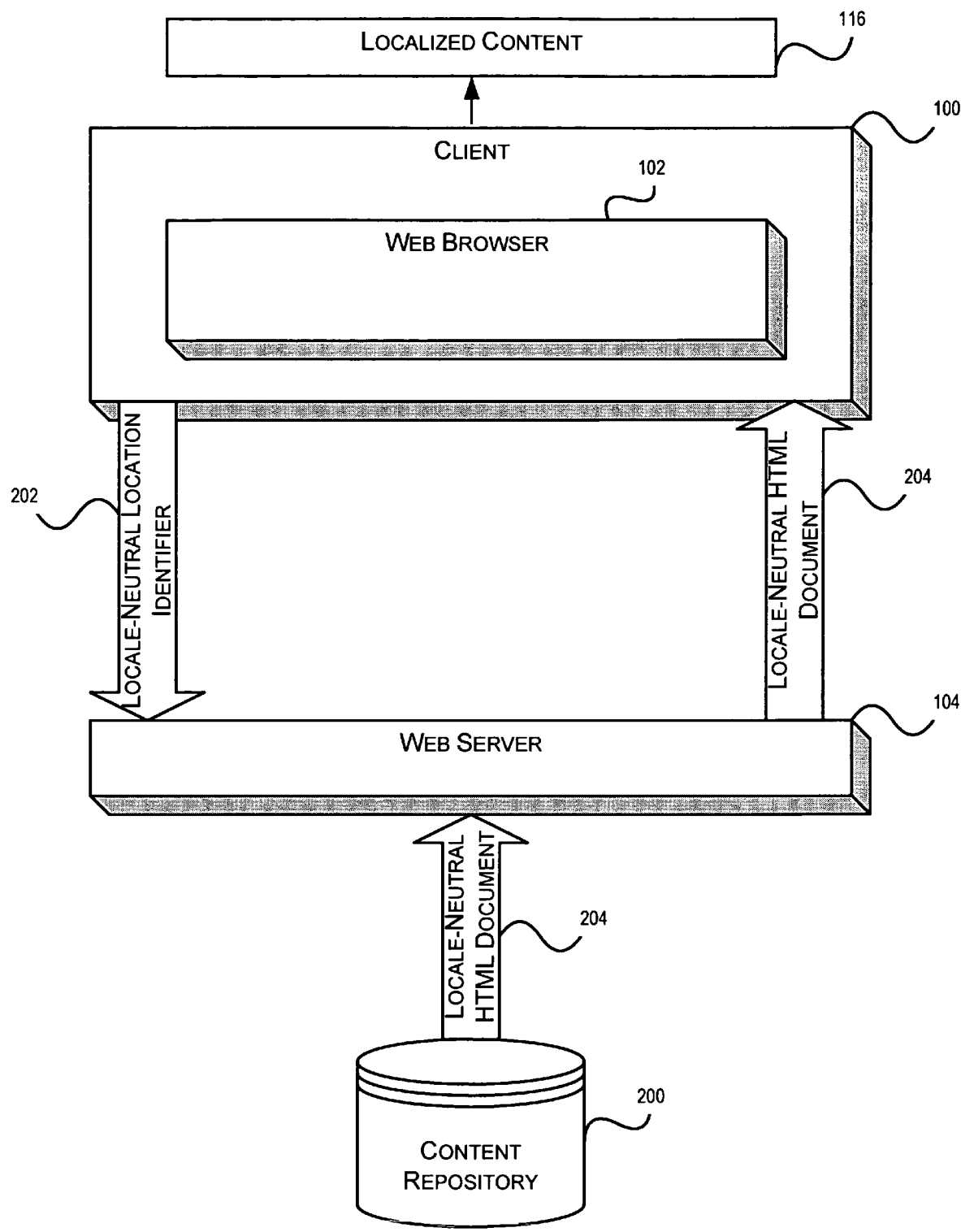
FIG. 2 illustrates an apparatus for deploying foreign language localization in an example embodiment of the present invention.

An apparatus (FIG. 2) is described for dynamic localization of electronic documents. A user sends a request for a computer system resource from a client computer system 100 (client) via a client application such as Web browser 102 (browser). The request specifies a locale-neutral location identifier 202, such as a locale-neutral uniform resource locator (URL). The locale-neutral location identifier 202 is sent to a server 104 (server). Server 104 retrieves the locale-neutral contents from the location specified by the location identifier, and delivers the locale-neutral contents 204 to client 100. Client 100 retrieves locale settings based on a selected locale. A localization function builds localized contents by applying the locale settings to the locale-neutral contents 204. Localized content 116 is then communicated.

Figure 3:
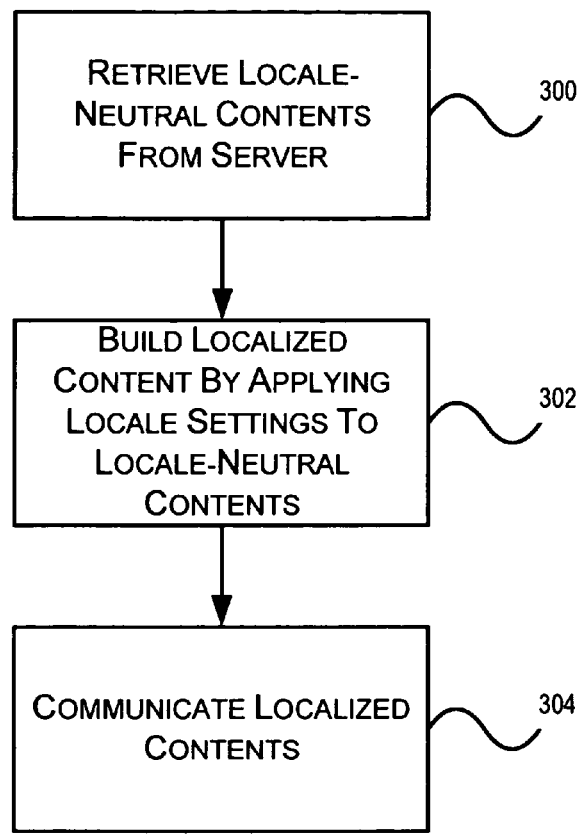
FIG. 3 illustrates a method for deploying foreign language localization in example embodiments of the present invention.
Figure 6:
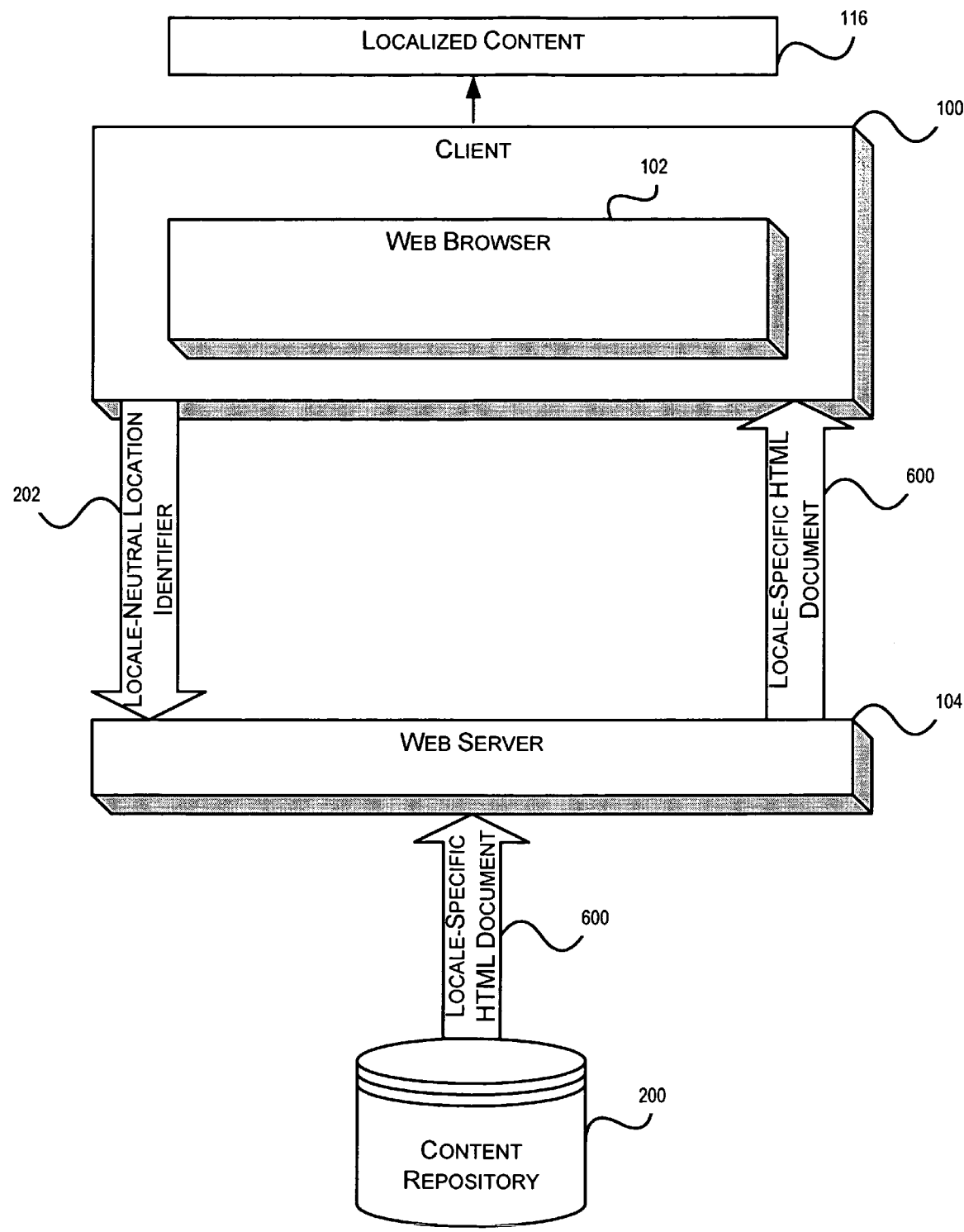
FIG. 6 illustrates an apparatus for deploying a localization in an example embodiment of the present invention.

Also described is a method (FIG. 3) for dynamic foreign language localization. The method comprises retrieving locale-neutral contents of a resource from a server 300, such as an HTML document. A locale for a client is determined, and locale settings corresponding to the locale are retrieved. Locale settings are applied to the locale-neutral contents to create localized contents 302, and the localized contents are communicated 304.

The example operations described below may be performed by hardware components or may be embodied in machine-executable instructions, which may be used to cause a general-purpose or special-purpose processor or logic circuits programmed with the instructions to perform the operations. Alternatively, the operations may be performed by a combination of hardware and software. An example embodiment of the present invention may be provided as a computer program product which may include a machine-readable medium having stored thereon instructions which may be used to program a computer (or other electronic devices) to perform a process. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the computer program products may also be downloaded, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

A resource, as used in example embodiments of the invention, describes data or routines that are available to programs. A resource, therefore, can include a document (i.e., a Web page), or a directory (i.e., home page of a Web site).

Introduction

The system and method described above may be implemented in a Web-based client/server environment, although it is also within the scope of the invention that such system and method exist on a single computer, or in a peer-to-peer computer environment.

A request for a Web resource on a Web server 104 is made from a client application such as a Web browser 102 on a client 100. Popular browsers include Netscape Navigator by Netscape Corporation, or Internet Explorer by Microsoft Corporation, although other browsers and other types of client applications are used. A Web resource can be a Web page, for example, and its resource location may be a uniform resource locator (URL). Resources, including Web resources, can alternatively be located by a directory path, for example.

When a user requests a Web resource, such as by typing in a URL, or selecting an icon on a Web Page associated with a URL, the request 202 (i.e., the URL) is passed to a Web server 104. The URL identifies a protocol to be used in accessing the resource, and a host. For instance, http: (Hypertext Transfer Protocol) specifies the protocol used to carry requests from a client browser to a Web server and to transport pages from Web servers back to the requesting browser; and ftp: (File Transfer Protocol) specifies an application-level protocol used for copying files to and from remote computer systems on a network using TCP/IP (Transmission Control Protocol/ internet Protocol). In the following URLs:

http://www.ibm.com http://www.ibm.com/dira/dirb/dirc/intro.html, http: tells the host to use the hyper-text transfer protocol for delivering documents/files, and www specifies the host name (World Wide Web). In both URLs, a resource is also specified. In the former, a toplevel directory of a Web site is specified (ibm.com, which also specifies the domain), and in the latter, a Web page is specified (intro.html, which resides on host www within the ibm.com domain, where the Web page file resides in the dira directory and the dirb/dirc subdirectory).

Whereas in currently existing systems a location identifier must be locale-specific to implement localization, in an example embodiment of the present invention, a location identifier is locale-neutral, meaning that the location identifier does not specify a locale. As localization refers to the process of altering a program so that it is appropriate for the area in which it is used, a locale can be a language (English, French, Spanish, or German), where text is translated into various languages, or it can be a department (i.e., Accounts Payable, Accounts Receivable, Receiving), where terms are changed for a specific use. Thus, language-specific is synonymous with locale-specific, and language-neutral is synonymous with locale-neutral.

Figure 1:
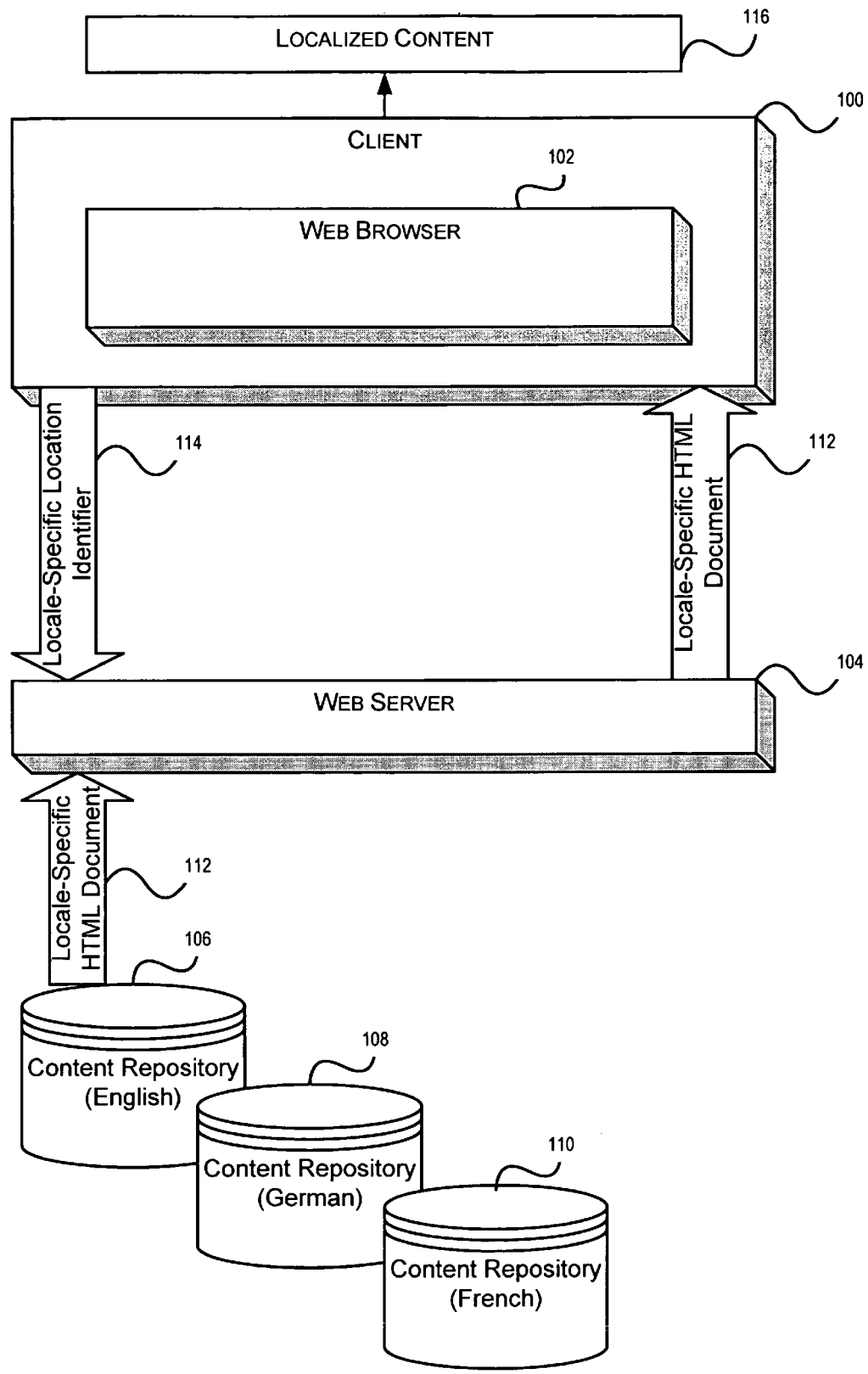
FIG. 1 illustrates an apparatus for deploying foreign language localization in currently existing systems.

In FIG. 1, the URL 114 requested by the user on client 100 is passed to server 104. In existing systems, server 104 returns a locale-specific HTML document 112. For example, TABLE 1 is an example of an HTML document, where the content is shown in boldface text:

TABLE 1

```
<html>
<head>
<TITLE>A simple example.</TITLE>
</head>
<body>
<H1>Hi. The following is an example list.</H1>
<P> The quick brown fox jumped over the lazy dog.</P>
<UL>
 <LI> List element one.
 <LI> List element two.
</UL>
<P> The quick brown fox jumped over the lazy dog again.</P>
</body>
</html>
```

The tags (i.e., TITLE, UL, LI) specify formatting characteristics of the content. For example, TITLE in this example is defined as 14-point, boldface text; UL specifies an unnumbered list; and LI specifies a list item. TABLE 2 illustrates the content of the HTML document of TABLE 1.

TABLE 2

This is a simple example.
Hi. The following is an example list.
The quick brown fox jumped over the lazy dog.
  List element one.
  List element two.
The quick brown fox jumped over the lazy dog again.

In existing systems, server has one copy of the HTML document for each locale. Server retrieves the copy for the locale specified by the URL, and simply returns the HTML document. Thus, client receives the HTML document, formats it, and then displays the formatted document (i.e., Web page). In embodiments of the present invention (FIG. 2), server 104 comprises a single, locale-neutral content repository 200 for a given resource, rather than a locale-specific repository for each locale (FIG. 1, 106, 108, 110).

String Tables

Locale-neutral content repository 200 comprises an HTML document that is not written for any specific locale. Lines 21-28 of FIG. 4 illustrate the concept of content being locale-neutral. Whereas in TABLE 1, content (shown in boldface) is written in English, and therefore, locale-specific, in lines 21-28 of FIG. 4, content (shown in boldface, i.e., getString(1), getString(2), getString(3), getString(4), getString(5), getString(6)),) is cross-referenced to an array of strings, and, therefore, enables the concept of locale-neutral content. Locale-specific content (or, localized content) is not locked in until a requested HTML document is received by client 100. When client 100 receives locale-neutral content 204, client 100 determines a locale, and retrieves locale settings corresponding to the locale.

In example embodiments of the invention, locale settings comprise localized strings. Content (referring to actual content, and not locale-specific content of an HTML document, nor to locale-neutral content) is parsed for each tagged element, such that each localized string corresponds to a tagged sentence or phrase. For example, content of TABLE 2 may be indexed as shown in TABLE 3:

TABLE 3

| INDEX | STRING |
|---|---|
| 1 | A simple example. |
| 2 | Hi. The following is an example list. |
| 3 | The quick brown fox jumped over the lazy dog. |
| 4 | List element one. |
| 5 | List element two. |
| 6 | The quick brown fox jumped over the lazy dog again. |

Each entry of TABLE 3 corresponds to a phrase, or parsed content, of TABLE 1: index 1 is tagged to element <TITLE>; index 2 is tagged to element <H1>; index 3 is tagged to first occurrence element <P>; index 4 is tagged to first occurrence element <L1>; index 5 is tagged to second occurrence element <L1>; and index 6 is tagged to second occurrence element <P>.

Parsing content into localized strings may be implemented using string tables 210. Each localized string is numerically indexed such that all strings that correspond to the same numerical index translate to the same phrase or sentence. For example, a string table for the locale "Spanish language" would have the same number of entries and the same indices as the string table for the locale "English language", but would comprise strings in the Spanish language:

TABLE 4

| INDEX | STRING |
|---|---|
| 1 | Esta es uno ejemplo sencillo. |
| 2 | Hola. El siguiente es una lista ejemplo. |
| 3 | El zorro rapido y pardo salto encima de el perro perezoso. |
| 4 | Lista elemento uno. |
| 5 | Lista elemento dos. |
| 6 | El zorro rapido y pardo salto encima de el perro perezoso otra vez. |

The string corresponding to index 1 in TABLE 3 (English) has the same meaning as the string corresponding to index 1 in TABLE 4 (Spanish); the string corresponding to index 2 in TABLE 3 (English) has the same meaning as the string corresponding to index 2 in TABLE 4 (Spanish), and so forth.

Since HTML has limited data manipulation and referencing capabilities, a programmatically versatile client-side scripting language is used to implement localization of locale-neutral content. JavaScript may be used, although other client-side scripting languages may be utilized as well. JavaScript, which is embedded in an HTML document, allows an HTML document to be delivered without the hard-coded locale-specific content. Since JavaScript allows variables to be declared, for instance, references can be made to content, rather than explicitly defining content.

In other embodiments, server (instead of client) may assemble document by cross-referencing array references to string table indices, so that server returns locale-specific content to client.

Dynamically Building a Localized Document

FIGS. 4 and 5 comprise sample code for dynamically localizing content. It should be understood, however, that these are only examples, and that there are various ways of implementing this concept. The invention, therefore, should not be limited to the implementation specified in the sample code.

Client 100 determines a locale (FIG. 4, line 20). The locale, such as a language selection, can be selected by a user, such as when a user wants a document to be displayed in German, or it can be a predetermined setting, such as in client's locale cookie (FIG. 5A, lines 5-6). In example embodiments, server 104 returns to client 100 locale-neutral content 204 of content repository 200 associated with the resource specified by a location identifier, as well as a strings table in accordance with the locale. Alternatively, server may return all strings tables.

Client 100 executes HTML code to build the Web page (FIG. 4, line 44). While HTML code is actually executed, client-side (i.e., hosted by the Web Browser) scripting language is used to build Web page and localized content. The JavaScript scripting language of Netscape Corporation is used, although other scripting languages, such as VBScript by Microsoft Corporation, or Perl by Larry Wall at NASA's Jet Propulsion Laboratory, may also be used.

Client 100 retrieves locale settings based on the locale (FIG. 4, lines 21-28). Variable new_Page comprises all strings in contents, and is then is written to the document (FIG. 4, lines 30-35). Each locale-neutral content (i.e., getString(1), etc.) is cross-referenced to an entry in a selected string table. For example, getString(1) is cross-referenced to index 1; getString(2) is cross-referenced to index 2; getString(3) is cross-referenced to index 3; getString(4) is cross-referenced to index 4; getString(5) is cross-referenced to index 5; and getString(6) is cross-referenced to index 6. (As a side note, if the string in index 6 comprised the same string as index 1, then an index 6 would not have been created, and the reference to the array in the last sentence would read getString (3) instead.)

Thus, if the current locale is "Spanish language", then client 100 sets the string table 210 to Spanish (FIG. 5B, lines 7-11). The indices 1-6 correspond to the strings as shown in TABLE 4, and the variable new_page is set as follows:

TABLE 5 var new_page = "<TITLE>" + Esta es uno ejemplo sencillo + "</TITLE>"
+ "<H1>" + Hola. El siguiente es una lista ejemplo. + "</H1>"
+ "<P>" + El zorro rapido y pardo salto encima de el perro perezoso. + "</P>";
+ "<UL>" + "<LI>" + Lista elemento uno. + "</LI>" + "</UL>"
+ "<UL>" + "<LI>" + Lista elemento dos. + "</LI>" + "</UL>"
+ "<P>" + El zorro rapido y pardo salto encima de el perro perezoso. + "</P>"

Strings are formatted according to their corresponding HTML syntax, but the execution of the formatting takes place under JavaScript. The end result of the localization process appears as shown in TABLE 5:

TABLE 6

Esta es uno ejemplo sincillo.
Hola. El siguiente es una lista ejemplo.
El zorro rapido y pardo salto encima de el perro perezoso.
   Lista elemento uno.
   Lista elemento dos.
El zorro rapido y pardo salto encima de el perro perezoso otra vez.

Changing a Locale

In an example embodiment, a user may change the language setting and override any default setting of the browser. In this case, function setLanguage is invoked instead of function getLanguage. The Web page can then be rebuilt in the manner shown in FIG. 4. If locale is changed from the Spanish language to the English language, then variable new_page is reset (FIG. 4, lines 21-28), and then rewritten (FIG. 4, lines 30-35).

Conclusion

As illustrated above, dynamic localization provides many advantages that are not possible in currently existing localization solutions. First, since there is always only one copy of localized contents for each locale, a content developer is relieved of the burden of having to synchronize various localized copies (i.e., one on a Web server, and one on a client). Secondly, if a user changes the locale, there is no need to reload the content: the HTML document with locale-neutral contents is already loaded on the client, and the locale-specific contents exist on the client.

In the foregoing specification, the invention has been described with reference to specific example embodiments thereof. It will, however, be evident that various modifications and changes may be made thereto without departing from the broader spirit and scope of the invention. The specification and drawings are, accordingly, to be regarded in an illustrative rather than a restrictive sense.

While the example embodiments of the invention have been described to operate in a Web-based client/server environment, it should be evident to one of ordinary skill in the art that this invention is applicable to any type of a client/server environment where a document is requested by a first computer, delivered by a second computer, and then localized on the first computer. For example, this invention is equally operable on an intranet, such as within an organization, wherein an employee requests a resource on the company server, such as a shared file. Furthermore, this invention is not limited to foreign language localization, but is broadly applicable to all areas of localization.

It should also be understood that client/server is not to be construed as being used in a strict sense. In other words, it is not imperative to the invention that one computer be a designated client, and that another computer be a designated server. Client/server should only be understood as meaning that one computer requests a document, and another computer provides the document.

What is claimed is:

1. A method for dynamic document localization, the method including:
   issuing a request for locale-neutral content, the request having a locale-neutral identifier;
   receiving the locale-neutral content responsive to the request; and
   building localized language content by applying a language setting for a current language selection to the locale-neutral content, wherein the language setting includes a language-specific string in a strings table corresponding to the current language selection and by applying a locale setting for current locale to the locale-neutral content, wherein the locale setting comprise a locale-specific string in a strings table corresponding to the current locale, and the locale-neutral content comprise array references to the locale-specific string and wherein the building of the localized language content comprises applying the locale-specific string in the strings table to the array references.

2. A method as in claim 1, wherein the locale-neutral identifier is a uniform resource location (URL).

3. A machine-readable medium having stored thereon data representing sets of instructions which, when executed by a machine, cause the machine to perform a method of claim 1.

4. A method for dynamic document localization, the method including:
   receiving a request for language-neutral content, the request having a language-neutral identifier;
   accessing the language-neutral content;
   communicating the language-neutral content to a client; and
   dynamically building localized language content by applying a language setting for a current language selection to the language-neutral content, wherein the accessing of the language-neutral content includes retrieving the language-neutral content by a server using the language-neutral identifier and, wherein the language setting comprise a language-specific string in a strings table corresponding to the language setting, and the language-neutral content comprise an array reference to the language-specific string, and wherein the building of the localized language content comprises applying the language-specific strings in the strings table to the array references, and the communicating of the language-neutral content includes providing the language-neutral content to a client.

5. A method as in claim 4 wherein the request is made over an Internet from a web browser.

6. A machine-readable medium having stored thereon data representing sets of instructions which, when executed by a machine, cause the machine to perform a method of claim 4.

7. A computer system for localizing a document, the system including:
   a content repository having locale-neutral content;
   a server, coupled with the content repository, to receive a request for the locale-neutral content from a client, the request having a locale-neutral identifier, to access the content repository to retrieve the locale-neutral content, and to provide the locale-neutral content to the client in the request; and
   the client in communication with the server, the client to determine a locale and locale setting corresponding to the locale, to receive the locale-neutral content from the server, and to build localized content by applying a language setting for a current language selection setting to the locale-neutral content, wherein the language setting includes a language-specific string in a strings table corresponding to the current language selection and by applying a locale setting for a current locale to the locale-neutral content, wherein the locale setting comprise a locale-specific string in a strings table corresponding to the current locale, and the locale-neutral content comprise array references to the locale-specific string, and wherein the building of the localized content comprises applying the locale-specific string in the strings table to the array references.

8. A system as in claim 7, further including a localization engine that resides at the client to build the localized content.

9. A computer system for localizing a document, the system including:
   first means for storing locale-neutral content;
   second means, coupled with the first means, for receiving a request for the locale-neutral content from a client, the request having a locale-neutral identifier, for accessing the content repository to retrieve the locale-neutral content, and for providing the locale-neutral content to the client in response to the request; and
   third means, in communication with the second means, for determining a locale and locale setting corresponding to the locale, for receiving the locale-neutral content from a server, and for building localized content by applying a language setting for a current language selection setting to the locale-neutral content, wherein the language setting includes a language-specific string in a strings table corresponding to the current language selection and by applying a locale setting for current locale to the locale-neutral content, wherein the locale setting comprise a locale-specific string in a strings table corresponding to the current locale, and the locale-neutral content comprise array references to the locale-specific string, and wherein the building of the localized content comprises applying the locale-specific string in the strings table to the array references.

10. The system of claim 9 further comprising a means for localizing that resides at the client to build the localized content.

11. The system of claim 9 wherein the request for local-neutral content is a uniform resource locator and wherein the request is made over an internet from a web browser of the client.

* * * * *